3,555,103
PREPARATION OF CYMENES
Max Strohmeyer, Ludwigshafen (Rhine), Germany, assignor to Badische Anilin- & Soda-Fabrik Aktiengesellschaft, Ludwigshafen (Rhine), Germany
No Drawing. Filed July 16, 1968, Ser. No. 745,093
Claims priority, application Germany, July 19, 1967,
1,643,629
Int. Cl. C07c 3/58, 5/22
U.S. Cl. 260—672        15 Claims

ABSTRACT OF THE DISCLOSURE

Process for the preparation of cymenes by reaction of methyldiisopropylbenzenes with toluene and propylene in two or three stages. The products of the new process are valuable starting materials for the production of plastics materials or fibers.

---

This invention relates to the production of cymenes by the reaction of methyldiisopropylbenzenes with toluene and propylene in two or three stages.

From the Journal of the American Chemical Society, volume 49 (1927), page 3142 et seq., it is known to alkylate toluene with olefins, for example, propylene, in the presence of Friedel-Crafts catalysts, mixtures of a large number of components being formed which are difficult to separate. Such components may be for example: benzene, toluene, o-xylene, m-xylene, p-xylene, o-cymene, m-cymene, p-cymene, cumene, all isomeric diisopropylbenzenes, methyldiisopropylbenzenes, dimethylisopropylbenzenes, trimethylbenzenes, triisopropylbenzenes, benzenes substituted four or more times by methyl and/or isopropyl radicals, or decomposition products.

However, a process can only be used on a large scale if it permits the yield of cymenes to be increased, the number of by-products to be diminished, and as much of the by-products obtained as possible to be recycled to the reaction. It is known (Houben-Weyl, Methoden der organischen Chemie, volume 4/2 (1955), page 95) that the content of a desired component in such mixtures may be increased by transalkylation. Since isopropyl and methyl groups are split off in such transalkylations and participate in the alkylation, the content of undesired xylenes and dimethylisopropylbenzenes in the mixture is also increased.

It is an object of this invention is to provide a new process for the production of cymenes in good yield and with the formation of a smaller number of by-products than in prior art processes, the fraction of the by-products which may be used again in the reaction being higher.

A further object of this invention is to provide a new process for the production of p-cymene with the simultaneous formation of far smaller amounts of the difficultly separable ortho-isomer than in prior art processes.

These and other objects of the invention are achieved and cymenes are obtained in an advantageous manner by reacting methyldiisopropylbenzenes with toluene in the molar ratio 1:1 in a transalkylation stage in the presence of aluminum chloride and hydrogen chloride, if desired isomerizing the reaction mixture formed in a subsequent isomerization stage, and reacting the resultant reaction mixture, together with toluene, in an alkylation stage with propylene, a molar ratio of total benzene rings to total C$_3$ between 1:0.75 and 1:0.95 being maintained in the transalkylation stage and between 1:0.2 and 1:0.8 being maintained in the alkylation stage.

As compared with the aforementioned processes, the process according to this invention yields cymenes in better yield with the formation of a smaller number of by-products, and the fraction of the by-products which may be used again in the reaction is higher. In the production of p-cymene, far smaller amounts of the difficultly separable o-isomer are obtained.

Methyldiisopropylbenzenes, preferably the 1,3,5- and 1,2,4-methyldiisopropylbenzene, and toluene or mixtures thereof are used as the starting materials. The aforementioned mixtures preferably contain a substance which can react in the transalkylation stage with toluene to form cymenes, for example triisopropylbenzene. The reaction mixture which is obtained at the end of the reaction after the alkylation stage is advantageously recycled after separation of the cymenes, and is used together with fresh starting materials as the starting mixture. If interest is centered on one specific end product only, for example p-cymene, any isomers formed in the reaction may be recycled to the starting mixture or may advantageously be added to the isomerization stage.

The process is carried out in three stages: in the first stage, the transalkylation stage, methyldiisopropylbenzenes are reacted with toluene, if desired in the form of the aforementioned mixtures, in a molar ratio of total benzene rings to total isopropyl groups between 1:0.75 and 1:0.95. Generally, only unreacted starting materials are obtained in addition to cymenes, preferably m- and p-cymene.

In the subsequent isomerization stage, the transalkylation is continued and the undesired cymene isomers are preferably isomerized; as a rule only isopropyl groups, and not methyl groups, are split off. Thus for example, in the production of p-cymene, the m- and o-cymenes obtained after the alkylation stage may be recycled to the isomerization stage. Without the addition of cymene, a molar ratio of total benzene rings to total isopropyl groups of between 1:0.75 and 1:0.95 is maintained in the isomerization stage, and with the addition of cymene a molar ratio of between 1:08 and 1:1. If no cymene isomerization is necessary or desired, the reaction mixture, if desired after prolonged reaction time in the transalkylation stage, may be transferred from this stage directly to the alkylation stage. Increased amounts of cymenes, especially the desired cymene isomers, and smaller amounts of the starting materials are obtained as products of the isomerization stage, without any substantial increase in the dimethyl compounds.

In the third stage, the alkylation stage, the reaction mixture of the isomerization stage is reacted with toluene and propylene, a molar ratio of total benzene rings to total C$_3$ of between 1:0.2 and 1:0.8 being maintained. The reaction is stopped when a molar ratio of total benzene rings to total isopropyl groups 1:0.8, preferably 1:0.4, has been attained.

Aluminum chloride and hydrogen chloride are used as catalyst in the reaction, advantageously in a molar ratio of 1:1. In general, 0.3 to 5, preferably 0.5 to 2% by weight of aluminum chloride, with reference to the total weight of hydrocarbons, is added to the transalkylation stage. It appears that aromatic complex compounds of aluminum chloride are formed in the transalkylation stage, which promote the isomerization or alkylation in the two following stages and decrease the formation of o-cymene and dimethyl compounds in favor of m-cymene and p-cymene. Accordingly, in general no further amounts of catalyst are added to these stages. If however additional amounts of cymene are added to the isomerization stage in the afore-mentioned way, a further addition of preferably 3 to 5% by weight of aluminum chloride, with reference to the amount by weight of added cymene, and the corresponding amount of hydrogen chloride is advantageous. These additional amounts may also form the afore-mentioned complex compounds, which promote the subsequent alkylation.

The reaction is advantageously carried out in the transalkylation and isomerization stages at a temperature between 20° and 75° C. and in the alkylation stage at a temperature between 20° and 110° C., preferably between 20° and 75° C. It may be carried out at atmospheric pressure or superatmospheric pressure, and continuously or batch-wise.

The reaction may be carried out as follows. A mixture of methyldiisopropylbenzene, toluene, aluminum chloride and hydrochloric acid is reacted in a transalkylation stage at the afore-mentioned temperature and in the afore-mentioned relative proportions for 1 to 3 hours while mixing thoroughly. The reaction mixture formed is isomerized, if desired with the addition of cymene isomers and further amounts of catalyst, in the afore-mentioned manner for a residence time of 0.3 to 1.5 hours. The reaction mixture of the isomerization stage is then reacted in a further alkylation stage with toluene and propylene in the afore-mentioned relative proportions and at the afore-mentioned temperature for a residence time of 0.5 to 30 minutes. The molar ratio of total benzene rings to total $C_3$ is advantageously determined by gas chromatography in the three stages, and suitably adjusted. The mixture leaving the alkylation stage may be separated from the catalyst, which may be used again for the propylation, or water is added to the mixture, which is preferable. In the latter case the organic phase which is formed is separated, and the cymenes are isolated by fractional distillation. Unreacted toluene is added to the transalkylation stage or alkylation stage, undesired cymene isomers are supplied to the isomerization stage, and xylenes, dimethyl- and methyldiisopropyl benzenes are supplied to the transalkylation stage.

The compounds which may be prepared according to the invention are valuable starting materials for the production of plastics or fibers.

With regard to the use of cymenes, reference is made to Ullmanns Encyklopädie der technischen Chemie, volume 10, page 82.

The invention is further illustrated by the following example in which parts are by weight.

EXAMPLE (Preparation of p-cymene)

58.8 parts of methyldiisopropylbenzene, 3 parts of o-cymene, 31 parts of toluene, 3 parts of aluminum chloride and 1.6 parts of hydrochloric acid (99% by weight) are introduced per hour, while stirring vigorously and at 75° C., to a stirred vessel (1) provided with an overflow. The mixture leaving the stirred vessel (97.4 parts per hour) has the following average composition:

| | Percent |
|---|---|
| Low boiling point fraction (B.P. 60° to 80° C.) | 0.2 |
| Benzene | 0.1 |
| Toluene | 22.4 |
| Xylenes | 0.9 |
| m-Cymene | 35.3 |
| p-Cymene | 17.3 |
| o-cymene | 1.3 |
| Dimethylisopropylbenzenes | 0.9 |
| Methyldiisopropylbenzenes | 21.2 |

This corresponds to a ratio of total benzene rings to total isopropyl groups of 1:0.84. During the reaction the total of the isopropyl groups is kept below 0.9 by regulating the rate of supply.

The product from stirrer vessel (1) is continuously passed to a second stirred vessel. 241 parts of m-cymene, 7 parts of aluminum chloride and 3.7 parts of hydrochloric acid (99% by weight) are added at 75° C. to this stirred vessel (2) per hour. The mixture leaving the second stirred vessel (349 parts per hour), has the following composition:

| | Percent |
|---|---|
| Benzene | 0.1 |
| Toluene | 17.0 |
| Xylenes | 1.3 |
| m-Cymene | 42.1 |
| p-Cymene | 17.2 |
| o-Cymene | 1.1 |
| Dimethylisopropylbenzenes | 1.3 |
| Methyldiisopropylbenzenes | 20.2 |

This corresponds to a ratio of total benzene rings to total of isopropyl groups of 1:0.91. In this stage, too, there is no increase in the amount of by-products.

The reaction mixture from vessel (2), which still contains about 3% by weight (with reference to the hydrocarbons) of emulsified catalyst complex compound, is reacted in a third stirred vessel at 75° C. while stirring vigorously with 520 parts of toluene and 39 parts of propylene per hour.

Water is added to the mixture (908 parts per hour) which continuously leaves the vessel, and the organic phase formed is separated from the aqueous phase and fractionally distilled. 892 parts are obtained from the stirred vessel (3), having the composition:

| | Percent |
|---|---|
| Benzene | 0.15 |
| Toluene | 51.6 |
| Xylenes | 0.65 |
| m-Cymene | 25.5 |
| p-Cymene | 13.7 |
| o-Cymene | 1.9 |
| Dimethylisopropylbenzenes | 0.2 |
| Methyldiisopropylbenzenes | 6.3 |

This corresponds to a ratio of total benzene rings to total isopropyl groups of 1:0.42. After distillation, toluene, the undesired cymenes, methyldiisopropylbenzenes, xylenes and dimethylisopropylbenzenes are recycled to the reaction.

I claim:

1. A process for the preparation of cymenes which comprises reacting methyldiisopropylbenzenes in a transalkylation stage with toluene in the presence of aluminum chloride and hydrogen chloride and reacting the resultant reaction mixture, together with toluene, in an alkylation stage with propylene, a molar ratio of total benzene rings to total $C_3$ of between 1:0.75 and 1:0.95 being maintained in the transalkylation stage and a molar ratio of total benzene rings to total $C_3$ of between 1:02 and 1:0.8 being maintained in the alkylation stage.

2. Process according to claim 1, wherein after a transalkylation stage the reaction mixture formed therein is isomerized in a subsequent isomerization stage, and the resultant reaction mixture is reacted, together with toluene, in an alkylation stage with propylene.

3. Process according to claim 1, wherein 1,3,5-methyldiisopropylbenzene is used as the starting material.

4. Process according to claim 1, wherein 1,2,4-methyldiisopropylbenzene is used as the starting material.

5. Process according to claim 1, wherein the starting mixture only contains substances which are capable of reacting with toluene in the transalkylation stage to form cymenes.

6. Process according to claim 1, wherein the reaction mixture which is obtained at the end of the reaction after the alkylation stage is recycled after separation of the cymenes and is used, together with fresh starting materials, as the starting mixture.

7. Process according to claim 2 wherein a molar ratio of total benzene rings to total isopropyl groups of between 1:0.75 and 1:0.95 is maintained in the isomerization stage without addition of cymene.

8. Process according to claim 2 wherein a molar ratio of total benzene rings to total isopropyl groups of between 1:0.8 and 1:1 is maintained in the isomerization stage with addition of cymene.

9. Process according to claim 1, wherein the reaction in the alkylation stage is stopped when a molar ratio of total benzene rings to total $C_3$ of 1:0.4 is attained.

10. Process according to claim 1, wherein the reaction is carried out with aluminum chloride and hydrogen chloride as catalyst in a molar ratio of 1:1.

11. Process according to claim 1, wherein the reaction in the transalkylation stage is carried out with 0.3 to 5% by weight of aluminum chloride, with reference to the total weight of hydrocarbons.

12. Process according to claim 1, wherein the reaction in the transalkylation stage is carried out with 0.5 to 2% by weight of aluminum chloride, with reference to the total weight of hydrocarbons.

13. Process according to claim 2, wherein the reaction in the transalkylation stage and the isomerization stage is carried out at a temperature between 20° and 75° C.

14. Process according to claim 1, wherein the reaction in the alkylation stage is carried out at a temperature between 20° and 110° C.

15. Process according to claim 13, wherein the reaction in the alkylation stage is carried out at a temperature between 20° and 75° C.

References Cited

UNITED STATES PATENTS

| | | | |
|---|---|---|---|
| 2,753,384 | 7/1956 | Lien et al. | 260—668 |
| 2,795,632 | 6/1957 | McCavlay et al. | 260—671 |
| 2,839,591 | 6/1958 | Enos | 260—668 |
| 3,337,647 | 8/1967 | Binder et al. | 260—671 |
| 3,375,290 | 3/1968 | Smeykal et al. | 260—672 |
| 3,398,206 | 8/1968 | Strohmeyer et al. | 260—671 |

DELBERT E. GANTZ, Primary Examiner

G. S. SCHMITKONS, Assistant Examiner

U.S. Cl. X.R.

260—671